3,819,695
PROCESS FOR PREPARATION OF METHYL-TEREPHTHALIC ACID AND 4-METHYLISO-PHTHALIC ACID
Gentaro Yamashita, Takeshi Fujii, and Koichiro Sakota, Iwakuni, Japan, assignors to Teijin Limited, Osaka, Japan
No Drawing. Filed Apr. 28, 1971, Ser. No. 138,307
Int. Cl. C07c 63/02, 63/26
U.S. Cl. 260—524 R           12 Claims

ABSTRACT OF THE DISCLOSURE

Methylterephthalic acid and 4-methylisophthalic acid are prepared by oxidizing pseudocumene with molecular oxygen in 3–25 parts by weight, per part of pseudocumene, of acetic acid at 100–220° C. with the partial pressure of oxygen maintained at not less than 0.2 atmosphere, in the presence of a catalyst consisting of a cobalt compound and a bromine compound both soluble in the acetic acid under the reaction conditions. The amounts of the catalyst components must meet the requirements shown by equations (Ia) and (IIa) which represent the relation among the reaction temperature (T), the ratio (A) of the weight of cobalt metal to that of pseudocumene and acetic acid combined, and the ratio (B) of gram-atoms of bromine to those of cobalt metal. A part of the cobalt compound may be replaced by a manganese compound.

---

This invention relates to a process for preparing methylterephthalic acid and 4-methylisophthalic acid by oxidizing pseudocumene with molecular oxygen. More particularly, it relates to a process for preparing a mixture of methylterephthalic acid (which will hereinafter be referred to as MTA) and 4-methylisophthalic acid (which will hereinafter be referred to as MIA) by oxidizing pseudocumene with molecular oxygen in acetic acid as a solvent in the presence of a specific proportion of a catalyst comprising a cobalt compound, or a cobalt compound and a manganese compound, and a bromine compound (in connection with the reaction temperature).

The reaction of this invention is expressed by the following reaction formula:

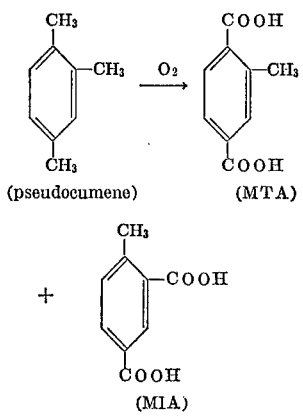

As compared with terephthalic acid and isophthalic acid, MTA and MIA have superior solubilities in various alcohols such as butanol, octanol, ethylene glycol, propylene glycol, glycerin and pentaerythritol, and so in case they are reacted with these alcohols to produce plasticizers, unsaturated polyesters or alkyd resins, the operation for reaction being easy, and further said plasticizers, unsaturated polyesters and alkyd resins obtained from MTA or MIA have superior resistance to heat and various superior mechanical properties as compared with those obtained from orthophthalic acid. Accordingly, MTA and MIA are useful intermediates for the production of plasticizers, unsaturated polyesters or alkyd resins.

Few processes for selectively producing MTA and MIA from pseudocumene have hitherto been known.

As one of such processes, the process of U.S. Pat. No. 3,008,983 has been known. In this process, a large amount of a ketone having methylene groups such as methyl ethyl ketone is used as promotor in addition to a cobalt compound used as the catalyst, and so this process has disadvantages that the ketone used as the promotor is consumed with the progress of the reaction, and that according to follow-up experiments made by the present inventors, a large amount of trimellitic acid is formed as a by-product as a result of the use of a large amount of ketone, and for this reason the formed MTA and MIA are colored by incorporation of the by-product or insoluble cobalt trimellitate when the mother liquor or oxidation reaction of this process is repeatedly subjected to the oxidation reaction.

Further, in U.S. Pat. No. 2,833,816 a process for producing polycarboxylic acids by oxidizing, e.g., methylbenzene, ethylbenzene, p-xylene and various polyalkyl aromatic compounds such as pseudocumene with molecular oxygen in the presence of a catalyst comprising a heavy metal compound, such as a cobalt compound or a manganese compound, and a bromine compound is proposed. Concretely, however, this U.S. patent merely discloses a process for oxidizing all of the 1–3 nuclear substitution alkyl groups of aromatic compounds. Accordingly, according to this process trimellitic acid is formed as a main product from pseudocumene.

Therefore, one object of the present invention is to provide a process for producing MTA and MIA by selectively oxidizing two of the three methyl groups of pseudocumene into carboxylic groups.

Another object of the present invention is to provide a process for producing MTA and MIA with high yields while minimizing the formation of by-products, especially trimellitic acid.

A still another object of the present invention is to provide a process for economically producing MTA and MIA having little if any coloration when a mother liquor (containing unreacted pseudocumene, intermediate oxidation products, a small amount of trimellitic acid, acetic acid as the solvent, catalyst composition, etc.) obtained by separating from the reaction mixture MTA and MIA obtained by oxidation reaction is circulated and oxidized.

Other objects and advantages of the present invention will be made apparent by the following explanation.

As a result of studies by the present inventors, it has been discovered that in order to restrain the formation of trimetallitic acid as a by-product and product MTA and MIA with high selectivity and yields in the oxidation of pseudocumene with molecular oxygen, it is very important to use acetic acid (as the solvent)-soluble cobalt compound (or cobalt compound and manganese compound) and bromine compound as the catalyst composition, to adjust the Br/Co or Br/Co+Mn atomic ratio of such catalyst composition within a specific range of comparatively small values, to use the cobalt compound (or the cobalt compound and the manganese compound) in a comparatively small amount within a specific range based on the total amount of the pseudocumene and acetic acid solvent charged, and further to adjust the Br/Co or Br/Co+Mn atomic ratio of the catalyst composition and the proportion of cobalt (or cobalt and manganese) to the sum of pseudocumene and acetic acid at values within specific ranges in relation to the reaction temperature.

Thus, according to the present invention, the above objects and advantages of the present invention can be achieved by oxidizing pseudocumene with molecular oxygen (1) with 3–25 parts by weight of acetic acid as solvent per part by weight of pseudocumene, (2) under an oxygen partial pressure not less than 0.2 atmosphere, (3) at a reaction temperature of 100–220° C. and (4) in the presence of a catalyst composition comprising a cobalt compound (or a cobalt compound and a manganese compound) and a bromine compound which are soluble in the acetic acid solvent under the reaction conditions in an amount satisfying the following equations (I) and (II).

$$-1.9 - 0.016 \times T \leq \log (A \cdot B) \leq -1.30 - 0.0115 \times T \quad (I)$$

$$1.60 - 0.011 \times T \leq \log (B/A) \leq 1.80 + 0.0115 \times T \quad (II)$$

wherein $A =$ $$\frac{\text{Weight of cobalt metal contained in the cobalt compound used, or total weight of cobalt and manganese metals contained in the cobalt and manganese compounds used}}{\text{Total weight of pseudocumene and acetic acid charged}}$$

$B =$ $$\frac{\text{Number of gram-atom of bromine in the bromine compound used}}{\text{Number of gram-atom(s) of cobalt metal or cobalt metal and manganese metal contained in the cobalt compound or cobalt compound and manganese compound used}}$$

and T is the reaction temperature (° C.) which is to be chosen from within the range of 100–220° C.

The present invention will be explained in more detail below.

Raw material and solvent

With respect to the amount of acetic acid to be used as the solvent in the process of the present invention, it is advantageous to use 3–25 parts by weight, preferably 5–20 parts, especially 6–10 parts of acetic acid per part by weight of pseudocumene. When the amount of acetic acid is below this range, the viscosity of the reaction mixture increases due to the MTA and MIA formed with the progress of reaction, which results in the formation of a thick slurry, the operation becoming very difficult. On the other hand, when the amount of acetic acid is above such range, the capacity of the reactor must be large, the amount of catalyst to be used increases, and this is economically disadvantageous.

It is preferable to add a small amount of water to the acetic acid solvent, since it increases the solubility of the below-described catalyst, but if the amount of water becomes too large, the oxidation reaction of the present invention is impeded. Further, in the oxidation reaction of the present invention water is formed as a by-product. Accordingly, it is preferable to use a water content in the acetic acid solvent of not more than 10% by weight, preferably not more than 5% by weight. The above amount of water includes all the water brought into the solvent during the reaction, such as the below-described water of crystallization of the catalyst component and the water formed as a by-product during the oxidation reaction of the present invention.

Molecular oxygen

The molecular oxygen to be used in the process of the present invention may be pure oxygen or an oxygen-containing gas obtained by dilution with an inert gas such as nitrogen, argon, helium or carbon dioxide, but it is most preferable to use air for operational and economical reasons. Further, the oxidation reaction of the present invention is carried out under an oxygen partial pressure not less than 0.2 atmosphere. Although the reaction proceeds even under an oxygen partial pressure less than 0.2 atmosphere, the rate of reaction is not sufficiently high. It is usually desirable from the viewpoints of the rate of reaction and the yield of MTA and MIA to carry out the reaction under an oxygen partial pressure of 0.2–10.0 atmospheres, preferably 1.0–5.0 atmospheres. The reaction is not affected adversely even if it is carried out under an oxygen partial pressure above the foregoing range, but the yield of MTA and MIA can not be improved by raising the oxygen partial pressure beyond such range. With respect to the reaction pressure, it suffices if it is high enough to the acetic acid in the liquid state in the reaction mixture.

Reaction temperature

The process of the present invention is carried out at a temperature within the range of 100–220° C., preferably 120–210° C., most preferably 130–230° C. At temperatures higher than this range, the amounts of trimellitic acid and other oxidation by-products are increased, whereas at temperatures lower than this range, the rate of the reaction is low.

Catalyst

As described above, in the present invention (a) the Br/Co or Br/(Co+Mn) atomic ratio in the catalyst composition, (b) the amount of cobalt (as metal) or cobalt and manganese (each as metal) based on the total amount of pseudocumene and acetic acid (solvent) and (c) adjustment of the conditions (a) and (b) in relation to the reaction temperature are very important factors for producing MTA and MIA with high selectivity and yields the oxidation of pseudocumene.

Thus, to explain the present invention as to the case where a cobalt compound and a bromine compound are used as the catalyst composition, it is necessary to use the cobalt compound and bromine compound in amounts which satisfy the following equations (Ia) and (IIa).

$$-1.9 - 0.016 \times T \leq \log (A \cdot B) \leq -1.30 - 0.0115 \times T \quad (Ia)$$

$$1.60 - 0.011 \times T \leq \log (B/A) \leq 1.80 + 0.0115 \times T \quad (IIa)$$

wherein $A =$ $$\frac{\text{Weight of cobalt metal contained in the cobalt compound used}}{\text{Weight of pseudocumene charged + Weight of acetic acid charged}}$$

$B =$ $$\frac{\text{Number of gram-atoms of bromine contained in bromine compound used}}{\text{Number of gram-atoms of cobalt metal contained in the cobalt compound used}}$$

and T is the reaction temperature.

The cobalt compound and bromine compound must be soluble in the acetic acid solvent under the reaction conditions of the present invention.

In the present invention, not more than 80% (based on the number of atoms of cobalt metal) of the cobalt compound which is a constituent of the catalyst composition may be replaced by a manganese compound containing the same number of atoms of manganese metal with the number of atoms of cobalt metal in the cobalt compound. Such manganese compound, too, must be soluble in the acetic acid (solvent) under the reaction conditions of the present invention.

As a matter of fact, it is preferable in the present invention to use a catalyst composition obtained by replacing 10–70% (based on the number of atoms of cobalt metal) of the cobalt compound in an amount satisfying equations (Ia) and (IIa) by the manganese compound containing manganese metal of the same number of atoms with that of the cobalt metal in the cobalt compound replaced, namely to use a cobalt compound and a manganese compound in a ratio of 90–30% to 10–70% based on the number of atoms of each metal contained in the compounds as well as a bromine compound in amounts satisfying said equations (I) and (II) [or equations (Ia) and (IIa)]. Thereby the rate of the oxidation reaction of the present invention can be increased, and as a result MTA and MIA can be produced with high selectivity and yields under milder reaction temperatures (e.g., 120–210° C.) and in a comparatively shorter period of time for reaction.

Further, both in the use of a catalyst composition consisting of a cobalt compound and a bromine compound, and in a catalyst composition consisting of a cobalt compound, a manganese compound and a bromine compound, it is preferable in the present invention to use the constituents of the catalyst composition in amounts which satisfy the following equations.

$$-1.5-0.016 \times T \leq \log (A \cdot B) \leq -1.50-0.0115 \times T \quad (I')$$

$$2.75-0.011T \leq \log (B/A) \leq 1.40+0.0115T \quad (II')$$

Especially, $$-1.35-0.016 \times T \leq \log (A \cdot B) \leq -1.60-0.0115 \times T \quad (I'')$$

$$2.90-0.011 \times T \leq \log (B/A) \leq 1.30+0.0115 \times T \quad (II'')$$

wherein $A=$

| Weight of cobalt metal or cobalt metal and manganese metal contained in the cobalt compound or cobalt compound and manganese compound used |
| --- |
| Weight of pseudocumene and acetic acid charged |

$B=$

| Number of gram-atoms of bromine contained in the bromine compound used |
| --- |
| Number of gram-atoms of cobalt metal or cobalt metal and manganese metal contained in cobalt compound or cobalt compound and manganese compound used | and T is the reaction temperature (° C.)

Thus, it is possible to minimize the formation of trimellitic acid as a by-product and to produce the objective MTA and MIA with higher selectivity and higher yield by a more stable operation as compared with the case where the reaction is carried out under conditions satisfying equations (I) and (II) [or equations (Ia) and (IIa)].

With regard to the cobalt compound, or the cobalt compound and the manganese compound, to be used in the catalyst composition of the present invention, it is preferable to use a cobalt and/or manganese salt of an aliphatic carboxylic acid having 2–4 carbon atoms such as acetic acid, propionic acid, butyric acid, oxalic acid or maleic acid; a cobalt or manganese salt of an alicyclic carboxylic acid such as naphthenic acid; a cobalt or manganese salt of an aromatic carboxylic acid such as benzoic acid, phthalic acid, isophthalic acid, terephthalic acid, methylterephthalic acid, 4-methylisophthalic acid or 4-methylorthophthalic acid; or an inorganic compound such as the hydroxide, oxide, carbonate, basic carbonate or bromide of cobalt and/or manganese, however any kind of cobalt and/or manganese; compound may be used in the present invention if only it is soluble in the acetic acid solvent under the reaction conditions of the present invention. However, of the above-mentioned cobalt and manganese compounds, cobalt acetate and manganese acetate are most preferable. Further, when only cobalt bromide, or cobalt bromide and manganese bromide, is or are used, the Br/Co or Br/(Co+Mn) atomic ratio can not satisfy equations (I) and (II) or other specific equations, and so in this case it is necessary to adjust the atomic ratio so as to be within the range specified in the present invention by using a cobalt compound and/or a manganese compound other than the cobalt bromide or cobalt bromide and manganese compound. The cobalt salts or manganese salts may be used either as anhydrous salts or as salt hydrates.

Further, with regard to the bromine compound which is used in the present invention as a constituent of the catalyst composition, bromine ($Br_2$) may also be used, but it is preferable to use a bromine compound such as a metallic salt of hydrogen bromide or hydrobromic acid, ammonium bromide or an organobromine compound. More particularly, ammonium bromide ($NH_4Br$), sodium bromide (NaBr), potassium bromide (KBr), cobalt bromide ($CoBr_2$), manganese bromide ($MnBr_2$), bromoacetic acid, benzyl bromide, tetrabromoethane, etc. can be mentioned. In the present invention, however, any bromine compound may be used if only it is soluble in the acetic acid (solvent) under the reaction conditions of the present invenion. Further, when said cobalt bromide and/or manganese bromide is used as the bromine compound, such a compound also serves as a source of the cobalt and/or manganese soluble in the reaction system of the present invention, and so it becomes necessary to adjust the Br/Co or Br/(Co+Mn) atomic ratio so as to be within the range specified in the present invention by using a cobalt or manganese compound containing no bromine.

Separation and after-treatment of reaction products

If the above-described reaction conditions of the present invention are satisfied, pseudocumene is easily oxidized and MTA and MIA can be produced with high yields. MTA and MIA can be separated and recovered by separating the solid content from the reaction mixture obtained by practicing the method of the present invention by customary procedures such as cooling or concentration and cooling and succeeding filtration, crystallization, etc. Further, according to the present invention, the mother liquor obtained by separation of the formed MTA and MIA from the reaction mixture comprises various useful substances such as a very small amount of pseudocumene; intermediate oxidation products such as dimethylbenzoic acids, dimethyl benzaldehydes and methylformylbenzoic acids; catalyst composition; and acetic acid (solvent), and beside water formed by reaction, a small amount of by-product trimellitic acid, etc. Therefore, according to the present invention, the whole or a part of the mother liquor can be circulated and re-used for the oxidation reaction of the present invention to use the useful substances effectively, if necessary after removal of excessive water therefrom. In this case, it goes without saying that it is preferable to supplement a proper amount of pseudocumene. Further, in this case a proper amount of the cobalt compound and/or the manganese compound or the bromine compound and/or a proper amount of acetic acid may be supplemented according to need, to adjust the ratios of these compounds in the reaction mixture so as to satisfy the above-described conditions of the present invention.

As described above, by circulating, the mother liquor separated after the oxidation reaction of the present invention and using it as the raw material for the oxidation reaction of the present invention, it is possible to produce the desired MTA and MIA from pseudocumene by the method of the present invention without any substantial loss of cobalt compound, (manganese compound), and bromine compound as well as acetic acid. According to the present invention, MTA and MIA with hardly any colouration can be produced with high selectivity and high yield while the formation of trimellitic acid as a by-product is minimized, even when the oxidation reaction is carried out by circulation.

The present invention will be explained below by means of Examples. However, it is to be understood that the following Examples by no means limit the scope of the present invention. In the Examples, parts means parts by weight unless otherwise mentioned.

Examples 19–23

1 part of pseudocumene, 8 parts of acetic acid, and a cobalt compound and a bromine compound shown in the following Table 2 were charged in the same reactor as that used in Examples 1–18, and the reaction was carried out for 15 minutes at a temperature of 180° C. under the same conditions as those of Examples 1–18.

The results were as shown in Table 2.

TABLE 2

| Example number | Cobalt compound | | Bromine compound | | Product, percent | | |
|---|---|---|---|---|---|---|---|
| | Kind | Parts | Kind | Parts | MTA plus MIA | Dimethyl-benzoic acid | Trimellitic acid |
| 19 | Cobalt acetate | 0.115 | Sodium bromide | 0.0019 | 76.9 | 8.1 | 8.6 |
| 20 | do | 0.115 | Hydrogen bromide | 0.0015 | 75.7 | 8.7 | 9.2 |
| 21 | Cobalt propionate | 0.13 | Sodium bromide | 0.0019 | 70.4 | 11.7 | 10.6 |
| 22 | Cobalt carbonate | 0.055 | Ammonium bromide | 0.0018 | 71.3 | 10.4 | 11.2 |
| 23 | Cobalt benzoate | 0.17 | do | 0.0018 | 68.9 | 15.2 | 9.6 |

Examples 1–18 and Comparative Examples 1–13

A pressure-resistant titanium reactor provided with a stirrer, a condenser and a gas blow-in pipe was charged with 1 part of pseudocumene, and cobalt acetate (tetrahydrate) ammonium bromide and acetic acid (amounts shown in Table 1), air was blown into the reactor at the rate of 20 parts/hr. while the reaction mixture was maintained at the temperature shown in Table 1, and the reaction was carried out under a pressure of 20 atmospheres. After the reaction was carried out under the reaction conditions, shown in Table 1 the reaction mixture was analyzed. The total yield of MTA and MIA, and the yields of dimethylbenzoic acid and trimellitic acid under the reaction conditions are shown in mol percent based on the amount of pseudocumene charged.

Examples 24–36 and Comparative Examples 14–30

1 part of pseudocumene, and acetic acid, cobalt acetate (tetrahydrate), manganese acetate (tetrahydrate) and ammonium bromide (amounts shown in the following Table 3) were charged in the same reactor as that used in Examples 1–18, air was blown into the reactor at the rate of 10 part/hr. while the reaction mixture maintained at a temperature shown in Table 3, and the reaction was carried out under a pressure of 20 atmospheres for the period of time shown in the same Table. The results were as shown in the same Table. Further, the results of experiments where no cobalt acetate was used are illustrated in the same Table as Comparative Examples 14–30.

TABLE 1

| Experiment number | Cobalt acetate, parts, $\times 10^2$ | Ammonium bromide, parts, $\times 10^3$ | $A \times 10^3$ | $B \times 10^3$ | Acetic acid, parts | Temp., °C. | Time, min. | MTA plus MIA | Dimethyl-benzoic acid, percent | Trimellitic acid, percent |
|---|---|---|---|---|---|---|---|---|---|---|
| Example: | | | | | | | | | | |
| 1 | 10.0 | 9.79 | 3.0 | 25 | 7 | 120 | 75 | 72.1 | 11.4 | 8.2 |
| 2 | 4.77 | 9.35 | 1.25 | 50 | 8 | 120 | 140 | 80.3 | 3.5 | 9.5 |
| 3 | 4.77 | 4.69 | 1.25 | 25 | 8 | 150 | 150 | 78.4 | 2.4 | 8.3 |
| 4 | 2.54 | 2.50 | 0.375 | 25 | 15 | 180 | 200 | 58.9 | 27.0 | 4.2 |
| 5 | 11.5 | 1.35 | 3.0 | 3.0 | 8 | 180 | 15 | 78.2 | 8.2 | 8.4 |
| 6 | 11.5 | 1.15 | 2.5 | 2.5 | 10 | 200 | 100 | 61.3 | 15.5 | 14.2 |
| 7 | 4.25 | 0.833 | 0.625 | 5.0 | 15 | 220 | 80 | 71.6 | 10.4 | 7.8 |
| 8 | 11.5 | 3.65 | 3.0 | 8.0 | 8 | 150 | 20 | 70.1 | 8.4 | 12.0 |
| 9 | 0.764 | 0.623 | 0.2 | 20 | 8 | 200 | 150 | 61.9 | 17.4 | 11.6 |
| 10 | 4.05 | 3.20 | 0.60 | 20 | 15 | 180 | 180 | 63.1 | 20.1 | 9.3 |
| 11 | 0.425 | 0.335 | 0.125 | 20 | 7 | 220 | 170 | 62.7 | 19.5 | 9.7 |
| 12 | 0.425 | 0.167 | 0.125 | 10 | 7 | 220 | 170 | 41.5 | 52.0 | 3.1 |
| 13 | 47.7 | 11.2 | 12.5 | 6.0 | 8 | 120 | 15 | 63.1 | 19.8 | 9.0 |
| 14 | 29.0 | 0.92 | 6.2 | 0.8 | 10 | 200 | 35 | 64.5 | 12.5 | 14.0 |
| 15 | 3.40 | 0.925 | 1.0 | 7.0 | 7 | 180 | 50 | 76.8 | 7.1 | 9.7 |
| 16 | 1.85 | 0.510 | 0.55 | 7.0 | 7 | 180 | 200 | 59.0 | 28.5 | 6.7 |
| 17 | 1.02 | 0.275 | 0.30 | 7.0 | 7 | 180 | 200 | 55.7 | 32.2 | 6.5 |
| 18 | 15.3 | 4.15 | 4.5 | 7.0 | 7 | 180 | 15 | 69.7 | 15.4 | 8.5 |
| Comparative Example: | | | | | | | | | | |
| 1 | 22.0 | 52.0 | 6.5 | 60 | 7 | 120 | 40 | 15.3 | 0 | 77.2 |
| 2 | 115 | 9.05 | 30.0 | 2.0 | 8 | 120 | 40 | 17.4 | 1.0 | 73.5 |
| 3 | 7.64 | 0.9 | 2.0 | 3.0 | 8 | 120 | 100 | 1.3 | 87.5 | 0 |
| 4 | 32.7 | 193 | 7.00 | 150 | 10 | 150 | 20 | 12.1 | 0 | 76.5 |
| 5 | 29.2 | 34.4 | 6.25 | 30 | 10 | 150 | 10 | 12.7 | 0 | 75.8 |
| 6 | 1.43 | 0.224 | 0.375 | 4.0 | 8 | 150 | 300 | 0.9 | 87.3 | 0 |
| 7 | 18.5 | 0.08 | 4.0 | 0.1 | 10 | 180 | 10 | 1.9 | 85.5 | 0 |
| 8 | 0.425 | 0.117 | 0.125 | 7.0 | 7 | 180 | 300 | 5.1 | 82.4 | 0 |
| 9 | 0.255 | 2.5 | 0.075 | 250 | 7 | 200 | 150 | 3.0 | 83.9 | 0 |
| 10 | 11.7 | 16.0 | 2.5 | 35 | 10 | 200 | 25 | 38.6 | 1.0 | 53.0 |
| 11 | 42.4 | 12.5 | 6.25 | 7.5 | 15 | 220 | 10 | 21.3 | 0.5 | 72.5 |
| 12 | 0.584 | 0.0172 | 0.125 | 0.75 | 10 | 220 | 250 | 8.2 | 81.5 | 0 |
| 13 | 0.584 | 0.0230 | 0.125 | 1.0 | 10 | 230 | 200 | 16.8 | 70.5 | 0 |

TABLE 3

| Experiment number | Cobalt acetate, parts, ×10² | Manganese acetate, parts, ×10² | Ammonium bromide, parts, ×10³ | CO:Mn (atomic ratio) | A×10³ | B×10² | Acetic acid, parts | Temp., °C. | Time, min. | MTA plus MIA, percent | Dimethyl-benzoic acid, percent | Tri-mellitic acid, percent |
|---|---|---|---|---|---|---|---|---|---|---|---|---|
| Example: | | | | | | | | | | | | |
| 24 | 3.82 | 0.94 | 9.35 | 8:2 | 1.25 | 50 | 8 | 120 | 110 | 78.5 | 4.2 | 8.9 |
| 25 | 1.91 | 2.82 | 4.69 | 4:6 | 1.25 | 25 | 8 | 150 | 80 | 76.4 | 2.6 | 11.2 |
| 26 | 1.52 | 1.0 | 2.50 | 6:4 | 0.375 | 25 | 15 | 180 | 40 | 62.1 | 15.2 | 13.9 |
| 27 | 3.48 | 7.95 | 1.15 | 3:7 | 2.5 | 2.5 | 10 | 200 | 60 | 60.4 | 17.3 | 14.2 |
| 28 | 3.05 | 0.35 | 0.925 | 9:1 | 1.0 | 7.0 | 7 | 180 | 20 | 78.1 | 7.0 | 9.5 |
| 29 | 1.49 | 0.37 | 0.510 | 8:2 | 0.55 | 7.0 | 7 | 180 | 100 | 62.2 | 25.4 | 6.9 |
| 30 | 0.355 | 0.0665 | 0.275 | 3.5:6.5 | 0.30 | 7.0 | 7 | 180 | 170 | 56.2 | 33.2 | 6.1 |
| 31 | 10.7 | 4.60 | 4.15 | 7:3 | 4.5 | 7.0 | 7 | 180 | 10 | 71.2 | 9.4 | 14.3 |
| 32 | 8.0 | 2.0 | 9.79 | 8:2 | 3.0 | 25.0 | 7 | 120 | 55 | 77.4 | 6.0 | 11.8 |
| 33 | 4.03 | 7.47 | 1.35 | 3.5:6.5 | 3.0 | 3.0 | 8 | 180 | 15 | 76.9 | 9.1 | 9.4 |
| 34 | 20.5 | 8.5 | 0.92 | 7:3 | 6.25 | 0.8 | 10 | 200 | 15 | 66.7 | 17.3 | 10.0 |
| 35 | 0.32 | 0.105 | 0.165 | 7.5:2.5 | 0.125 | 10.0 | 7 | 220 | 110 | 59.7 | 29.4 | 5.7 |
| 36 | 2.15 | 2.15 | 0.833 | 5:5 | 0.625 | 5.0 | 15 | 220 | 40 | 72.3 | 9.5 | 13.1 |
| Comparative Example: | | | | | | | | | | | | |
| 14 | None | 4.70 | 4.69 | 0:10 | 1.25 | 25 | 8 | 150 | 400 | 25.0 | 63.5 | 1.2 |
| 15 | None | 2.50 | 2.50 | 0:10 | 0.375 | 25 | 15 | 180 | 500 | 27.3 | 61.2 | 1.4 |
| 16 | 0.255 | 0.167 | 0.117 | 6:4 | 0.125 | 7.0 | 7 | 180 | 300 | 12.2 | 78.9 | 0.1 |
| 17 | 25.0 | 10.7 | 9.7 | 7:3 | 10.5 | 7.0 | 7 | 180 | 10 | 15.2 | 0 | 75.9 |
| 18 | 11.0 | 11.0 | 52.0 | 5:5 | 6.5 | 60 | 7 | 120 | 20 | 14.1 | 0 | 78.1 |
| 19 | 103 | 12.0 | 9.05 | 9:1 | 30.0 | 2.0 | 8 | 120 | 20 | 16.0 | 0 | 76.2 |
| 20 | 1.53 | 6.12 | 0.90 | 2:8 | 2.0 | 3.0 | 8 | 120 | 100 | 2.0 | 86.2 | 0 |
| 21 | 29.5 | 3.5 | 193 | 9:1 | 7.0 | 150 | 10 | 150 | 10 | 8.1 | 0 | 79.1 |
| 22 | 11.7 | 17.5 | 34.4 | 4:6 | 6.25 | 30 | 10 | 150 | 10 | 8.3 | 0 | 79.9 |
| 23 | 0.87 | 0.58 | 0.224 | 6:4 | 0.375 | 4.0 | 8 | 150 | 300 | 2.1 | 76.5 | 0 |
| 24 | 7.4 | 11.1 | 0.11 | 4:6 | 4.0 | 0.15 | 10 | 180 | 10 | 2.2 | 85.5 | 0 |
| 25 | 0.255 | 0.17 | 0.117 | 6:4 | 0.125 | 7.0 | 7 | 180 | 300 | 7.2 | 80.6 | 0 |
| 26 | 0.102 | 0.153 | 2.50 | 4:6 | 0.075 | 250 | 7 | 200 | 150 | 4.0 | 83.0 | 0 |
| 27 | 8.20 | 3.50 | 16.0 | 7:3 | 2.5 | 35 | 10 | 200 | 10 | 34.6 | 0.7 | 57.2 |
| 28 | 31.8 | 10.6 | 12.5 | 7.5:2.5 | 6.25 | 7.5 | 15 | 220 | 10 | 12.4 | 0.5 | 79.7 |
| 29 | 0.292 | 0.292 | 0.0172 | 5:5 | 0.125 | 0.75 | 10 | 220 | 250 | 10.4 | 79.2 | 0 |
| 30 | 0.526 | 0.058 | 0.023 | 9:1 | 0.125 | 1.0 | 10 | 230 | 200 | 21.9 | 65.0 | 2.0 |

Example 37

A mixture consisting of 1 part of pseudocumene, 0.0477 part of cobalt acetate tetrahydrate, 0.00469 part of ammonium bromide and 8 parts of acetic acid was subjected to reaction under the same conditions as those of Example 3; thereafter it was cooled to 20° C., and then the formed precipitate of MTA and MIA was separated from the reaction mixture by filtration. The water formed was removed from the mother liquor by distillation, the ratio of charge was adjusted so as to be the same as the above-described ratio of starting materials, and then the second oxidation reaction was carried out under the same conditions with those of the first oxidation reaction. Thus, a cyclic oxidation reaction was repeated, and it always proceeded smoothly. After carrying out the oxidation reaction five times, the reaction mixture was cooled to 20° C., and then the precipitate formed was separated therefrom. The yield of MTA and MIA was always 77.3 mol percent throughout the five times of the cyclic oxidation. Aqueous acetic acid solution containing 10% of water was added to the precipitate consisting mainly of MTA and MIA separated by filtration from the oxidation product obtained after five times of cyclic oxidation so that the concentration of MTA and MIA became 20% by weight, and it was stirred at 100° C. for 30 minutes, and then it was cooled to 20° C. to effect solid-liquid separation by filtration. The precipitate thus obtained was further washed by following the same procedure. 1 g. of the resultant mixture of MTA and MIA was dissolved in 10 c.c. of 7% ammonia water, it was placed in an optical cell having a thickness of 1 cm., and then its absorbance at a wave length of 370 mμ was measured. The result was 0.48.

Comparative Example 31

8 parts of acetic acid, 0.5 part of cobalt acetate tetrahydrate and 0.4 part of methyl ethyl ketone were added to 1 part of pseudocumene, and then it was oxidized with air for 60 minutes at a temperature of 130° C. and under a pressure of 20 atmospheres.

After the reaction mixture was cooled to 20° C., the formed precipitate of MTA and MIA was separated therefrom by filtration. The water formed was removed from the mother liquor by distillation, the ratio of charged components was adjusted so as to be the same with that of the starting charge, and then it was heated again to 130° C. to carry out a second oxidation reaction. After such an oxidation reaction was repeated 5 times, the reaction product was cooled to 20° C. and the precipitate formed was separated by filtration. The yield of MTA and MIA was always 70.4 mol percent throughout 5 cyclic oxidation reactions. Further, the amount of metal ethyl ketone consumed per part of MTA and MIA formed was 0.35%.

An aqueous acetic acid solution containing 10% of water was added to the precipitate consisting mainly of MTA and MIA separated by filtration from the oxidation product obtained after the 5 cyclic oxidation reactions so that the concentration of MTA and MIA became 20% by weight, the mixture was stirred at 100° C. for 30 minutes, and then it was cooled to 20° C. to effect solid-liquid separation by filtration. The precipitate thus obtained was further washed by following the same procedure.

1 g. of the resultant mixture of MTA and MIA was dissolved in 10 cc. of 7% ammonia water, the solution was placed in an optical cell having a thickness of 1 cm. and then its absorbance at a wave length of 370 mμ was measured. The result was 2.01.

We claim:
1. A process for the preparation of methylterephthalic acid and 4-methylisophthalic acid which comprises oxidizing pseudocumene with molecular oxygen (1) in 3–25 parts by weight, per part by weight of pseudocumene, of acetic acid as a solvent, (2) under an oxygen partial pressure of not less than 0.2 atmosphere, (3) at a reaction temperature of 100–200° C. and (4) in the presence of a catalyst selected from (A) a catalyst consisting of a cobalt compound and a bromine compound which are soluble in said acetic acid solvent under the reaction conditions, and (B) catalyst (A) in which not more than 80% of said cobalt compound calculated on the basis of the number of atoms of cobalt metal is replaced by a manganese compound containing manganese metal of the same number of atoms as that of the cobalt metal contained in said cobalt compound, the amounts of the cata- lyst compounds satisfying the following equations (Ia) and (IIa):

$$-1.5-0.016 \times T \leq \log(A \cdot B) \leq -1.50 - 0.0115 \times T \quad \text{(Ia)}$$

$$2.75-0.011 \times T \leq \log(B/A) \leq 1.40 - 0.0115 \times T \quad \text{(IIa)}$$

wherein

A =

$$\frac{\text{Weight of cobalt metal or cobalt metal and manganese metal contained in said cobalt and manganese compounds}}{\text{Weight of pseudocumene and acetic acid charged}}$$

B =

$$\frac{\text{Number of gram-atoms of bromine contained in said bromine compound}}{\text{Number of gram-atoms of cobalt metal or cobalt metal and manganese metal contained in said cobalt and manganese compounds}}$$

and T is the reaction temperature (° C.).

2. The process of claim 1 wherein 5–20 parts by weight of acetic acid per part by weight of pseudocumene are used.

3. The process of claim 1 wherein 10–70% of said cobalt compound calculated on the basis of the number of atoms of cobalt metal is replaced by a manganese compound containing manganese metal of the same number of atoms as that of the cobalt metal.

4. The process of claim 1 wherein said cobalt compound, or said cobalt compound and said manganese compound, and said bromine compound are used in amounts satisfying the following equations (I″) and (II″).

$$-1.35-0.016 \times T \leq \log(A \cdot B) \leq -1.60 - 0.0115 \times T \quad \text{(I″)}$$

$$2.90-0.011 \times T \leq \log(B/A) \leq 1.30 + 0.0115 \times T \quad \text{(II″)}$$

wherein A, B and T have the same meanings as defined above.

5. The process of claim 1 wherein said reaction temperature is within the range of 120–210° C.

6. The process of claim 2 wherein 6 to 10 parts by weight of acetic acid per part by weight of pseudocumene are used.

7. The process of claim 1 wherein said acetic acid solvent has a water content of not more than 10% by weight.

8. The process of claim 7 wherein said acetic acid solvent has a water content of not more than 5% by weight.

9. The process of claim 1 wherein the reaction is carried out under an oxygen partial pressure of 0.2–10.0 atmospheres.

10. The process of claim 9 wherein the reaction is carried out under an oxygen partial pressure of 1.0–5.0 atmospheres.

11. The process of claim 1 wherein said manganese compound is selected from manganese salts of aliphatic carboxylic acids having 2–4 carbon atoms, manganese salts of alicyclic carboxylic acids, manganese salts of aromatic carboxylic acids, and inorganic compounds of manganese.

12. The process of claim 1 wherein said cobalt compound is selected from cobalt salts of an aliphatic carboxylic acid having 2–4 carbon atoms, cobalt salts of alicyclic carboxylic acids, cobalt salts of an aromatic carboxylic acid and inorganic compounds of cobalt.

References Cited

UNITED STATES PATENTS 2,833,816  5/1958  Saffer et al. ......... 260—524

LORRAINE A. WEINBERGER, Primary Examiner

R. D. KELLY, Assistant Examiner

UNITED STATES PATENT OFFICE
CERTIFICATE OF CORRECTION

Patent No. 3,819,695                      Dated June 25, 1974

Inventor(s) Yamashita, et al.

It is certified that error appears in the above-identified patent and that said Letters Patent are hereby corrected as shown below:

In the heading, insert:

-- Claims priority, application Japan, filed May 1, 1970, No. 45/37252 --

Claim 1, last line, delete "(0°C.)", insert -- (°C.) --

Claim 4, line 4, delete "(II')", insert -- (I") --

Signed and sealed this 4th day of February 1975.

(SEAL)
Attest:

McCOY M. GIBSON JR.
Attesting Officer

C. MARSHALL DANN
Commissioner of Patents